United States Patent [19]

Winston

[11] Patent Number: 4,776,738
[45] Date of Patent: Oct. 11, 1988

[54] FASTENING DEVICE

[76] Inventor: Emanuel A. Winston, 1448 Old Skokie Rd., Highland Park, Ill. 60035

[21] Appl. No.: 885,152

[22] Filed: Jul. 14, 1986

[51] Int. Cl.$^4$ ............................................. F16B 39/02
[52] U.S. Cl. ..................................... 411/82; 411/101; 411/258
[58] Field of Search ................. 29/526 R; 411/81, 82, 411/83, 101, 258

[56] References Cited

U.S. PATENT DOCUMENTS

| | | | |
|---|---|---|---|
| 702,663 | 6/1902 | Lyle . | |
| 3,036,728 | 5/1962 | Gibb . | |
| 3,472,301 | 10/1969 | Pearce, Jr. | 151/14.5 |
| 3,532,316 | 10/1970 | Mathes | 248/205 |
| 4,063,582 | 12/1977 | Fischer | 151/41.7 |
| 4,675,972 | 6/1987 | Bappert et al. | 29/526 R |
| 4,691,685 | 9/1987 | Dempsey | 125/14 |

FOREIGN PATENT DOCUMENTS

613415 1/1961 Canada .
2515950 10/1976 Fed. Rep. of Germany .

*Primary Examiner*—Timothy V. Eley
*Attorney, Agent, or Firm*—Frijouf, Rust & Pyle

[57] ABSTRACT

An improved fastening device is disclosed for securing within an aperture of a workpiece. The invention comprises a longitudinally extending body member for insertion within the aperture of the workpiece. The fastening device includes a locking shoulder secured to the longitudinally extending body member such that the shoulder is spaced relative to a surface of the workpiece by resilient material. A groove is disposed in the body member for receiving the resilient material for coacting between the body member and the workpiece for reducing undesired movement therebetween. In an alternative embodiment of the invention a fastening device is disclosed for the reception therein of a thermo-setting material, the device being secured within a plurality of apertures defined by a multi-layered workpiece. The fastening device includes a first lamina member which defines a first plurality of transverse bores each of which are aligned with an aperture of the plurality of apertures. A plurality of elongate members each having a first and a second end are secured with the first end of each of the elongate members being disposed within one of the plurality of bores such that there is a clearance between the workpiece and each of the elongate members. The clearance is filled with the thermo-setting material so that there is no contact between the workpiece and the elongate members.

23 Claims, 5 Drawing Sheets

FASTENING DEVICE

BACKGROUND OF THE INVENTION

1. Field of the Invention

This invention relates to fasting devices. More particularly, this invention relates to fastening devices for fastening together a multilayered workpiece in which the fastening device receives therein a thermo-setting material, the device being secured within a plurality of apertures defined by a multi-layered workpiece or the like.

2. Information Disclosure Statement

A common source of failure of conventional metallic fasteners is caused by the vibration or movement between the metallic fastening device and the metallic workpiece. This movement results in fatiguing and the wear of the metallic fastening device which enables further movement resulting in further deterioration of the fastening device. Various types of means and methods have been provided in the prior art for eliminating this undesired movement between a metallic fastening device and a metallic workpiece.

Some examples of patents which are pertinent to the instant invention include U.S. Pat. Nos. 207,871, 2,408,559, 2,410,398, 2,417,262, 2,453,994, 2568,075, 2,677,149, 2,928,446, 2,989,107, 3,362,276, 3,293,977, 4,088,327, 4,140,742, 4,163,812, 4,183,974 and 4,189,369.

Although these prior art patents have solved some of the needs of the prior art, none of these patents have successfully provided a simple and efficient fastening device for securing within an aperture of a workpiece for reducing the undesired movement therebetween.

Particularly in the aircraft industry, it has been customary to rivet juxtaposed plates together. These prior art rivets have often included a head portion protruding from the smooth surface of the plate being riveted. Such protruding heads not only detract from the aesthetic appearance of the aircraft, but more particularly present a resistance to air flow resulting in increased fuel costs and a reduction in maximum relative speed of the aircraft.

Although in the prior art various proposals have been disclosed for blind riveting aircraft plates having countersunk heads, these prior art proposals have necessitated the employment of relatively complex riveting equipment. Furthermore, a need has existed in the art for flexibly bonding together adjacent plates in the aircraft industry because it has been found that such flexible bonding reduces the amount of metal fatigue that has been associated with the prior art riveted plates.

The present invention provides a fastening device which enables a plurality of metal plates or lamina to be flexibly bonded together by means of a plurality of elongate members which define channels for the insertion therein of a thermo-setting resin or the like such that there is a clearance between the elongate members and the metal plates, the clearance being filled with the resin.

Therefore it is an object of this invention to provide an apparatus which overcomes the aforementioned inadequacies of the prior art devices and provides an improvement which is a significant contribution of the advancement of the fastening art.

Another object of this invention is to provide a fastening device for securing within aperture of a workpiece having a groove disposed along a longitudinally extending body member of the fastening device for receiving a resilient material within the groove for co-acting between the body member and the workpiece for reducing undesired movement thereby.

Another object of this invention is to provide a fastening device for securing within an aperture of a workpiece incorporating a thermal liquifying material within the groove to seal the fastening device to the workpiece upon the application of heat.

Another object of this invention is to provide a fastening device for securing within an aperture of a workpiece including a thermal expandable material disposed within the groove of the fastening device to seal the fastening device to the workpiece upon the application of heat.

Another object of this invention is to provide a fastening device for securing within an aperture of a workpiece wherein a resilient material is injected between the fastening device and the workpiece after insertion of the fastening device into the aperture of the workpiece.

Another object of this invention is to provide a fastening device for securing within an aperture of a workpiece including an aperture extending through a fastener head of the fastening device and in fluid communication with the grooves extending along a longitudinally extending body member of the workpiece enabling a resilient material to be introduced through the fastening head aperture to fill the groove and region between the fastening device and the workpiece to reduce vibration therebetween, the resilient material being disposed between the workpiece and the fastening device such that the workpiece does not contact the fastening device.

Another object of this invention is to provide a method of installing a rivet into an aperture of a workpiece by inserting the rivet into the aperture of the workpiece and deforming the rivet into the aperture of the workpiece and subsequently injecting a resilient material through a head aperture in the rivet to resiliently engage the rivet to the workpiece.

Another object of the present invention is to provide a fastening device for fastening together a multi-layered workpiece that overcomes the aforementioned inadequacies of the prior art devices and provides an improvement which significantly contributes to the reduction in wind resistance of the fastened workpiece and the inhibition of metal fatigue.

Another object of the present invention is the provision of a fastening device for the reception therein of a thermo-setting material in which the thermo-setting material is injected within a channel extending through the fastening device such that the thermo-setting material fills the interstices between the multi-layers of the workpiece and the fastening device.

Another object of the present invention is the provision of a fastening device which includes a first lamina member which defines a plurality of transverse bores each of which are aligned with an aperture of the plurality of apertures defined by the multi-layered workpiece and a plurality of elongate members secured to the first lamina member and extending through the respective apertures such that the thermo-setting resin flows along an internal channel of the elongate member to fill the interstices between the multi-layers and the elongate members.

Another object of the present invention is the provision of a fastening device in which the channel extends from a first end of the elongate member towards the second end thereof and a plurality of lateral holes radiate from the longitudinal channel to the outer surface of the elongate member such that the thermo-setting material flows through the channel and through the lateral holes to fill the interstices between the apertures and the elongate members.

Another object of the present invention is the provision of a fastening device in which the first lamina member is planar and includes a sprue and a plurality of radially extending passages defined by the first lamina member such that each of the passages extends radially from the sprue to one of the channels so that the thermo-setting material is injected through the sprue and flows along each of the passages and along each of the channels and holes to fill interstices between the plurality of apertures and the elongate members for fastening the layers of the workpiece together.

Another object of the present invention is the provision of a fastening device in which the elongate members each further include a plurality of annular grooves, each of the grooves being located along the length of the elongate member such that material flowing laterally out of the holes flows around the grooves before flowing into the interstices between the plurality of apertures and the elongate members within the apertures.

Another object of the present invention is the provision of a fastening device including a second lamina member which defines a second plurality of transverse bores each of which are aligned with an aperture of the plurality of apertures defined by the workpiece such that the second ends of each of the plurality of elongate members are secured within a bore of the second plurality of bores when the elongate members extend through the workpiece.

Another object of the present invention is the provision of a fastening device in which at least some of the lateral holes terminate within the bores of the second plurality of bores such that a portion of the thermo-setting material fills the interstices between the second end of each of the elongate members and the bores of the second lamina member.

Another object of the present invention is the provision of a method of fastening together a plurality of layers of a workpiece. The method includes clamping the first lamina member against the workpiece and drilling a plurality of bores therethrough, inserting the elongate members within the bores of the first lamina member, inserting the second ends of the elongate members within the apertures formed in the workpiece and injecting thermo-setting material into the longitudinal channels to fill the interstices between the apertures of the workpiece and the elongate members such that the workpiece and elongate members are spaced relative to each other by the thermo-setting material.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a further understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims in a specific embodiment shown in the attached drawings. For the purpose of summarizing the invention, the invention may be incorporated into a fastening device for securing within an aperture of a workpiece comprising a longitudinally extending body member for insertion within the aperture of the workpiece. A locking shoulder is secured to the longitudinally extending body member for engagement within the workpiece. A groove is disposed in the longitudinally extending body member for receiving a resilient means established in the groove for co-acting between the longitudinally extending member and the workpiece for reducing undesired movement therebetween.

In a more specific embodiment of the invention, the fastening device may comprise a metallic body member with the metallic locking means including a shoulder extending radially outward from the cylindrical member forming a fastener head. The groove communicates through an aperture in the fastener head for enabling introduction of the resilient means after insertion of the fastener in the aperture of the workpiece. The grooves may be disposed in the surface of the cylindrical body member of the fastening device and may extend as a helix along the outer cylindrical surface or may comprise a plurality of annular grooves intermittently spaced along the cylindrical body member. In either case, the grooves communicate through a passage to the aperture in the fastener head.

The resilient means may be secured to the fastening device prior to the insertion or may be injected after insertion of the fastening device within the workpiece. The resilient means may include a thermal liquifying material to seal the fastening device of the workpiece upon application of heat. In the alternative, the resilient means may include a thermal expandable material to seal the fastening device to the workpiece upon application of heat. In still a further embodiment, the resilient means may include a resilient adhesive.

The invention also is incorporated in the method of installing a fastening device having a fastening head into an aperture of a workpiece comprising the steps of inserting the fastening device into the aperture of the workpiece. The fastening device is then secured within the aperture of the workpiece by mechanical means. A resilient material is then injected between the fastening device and the workpiece for sealing the fastening device to the workpiece.

Another embodiment of the present invention relates to a fastening device and a method of fastening a multilayered workpiece in which the fastening device defines means for the reception therein of a thermosetting material. The fastening device includes a first lamina member defining a first plurality of transverse bores such that each of the bores is aligned with an aperture of the plurality of apertures. A plurality of elongate members each includes a first end and a second end with the first end of each of the elongate members being secured within one of the plurality of bores. Each of the elongate members defines a longitudinal channel which extends from the first end of the elongate member towards the second end thereof. The channel terminates before the second end of the elongate member. Each of the elongate members also includes a plurality of lateral holes which extend from the channel to the outer surface of the elongate member such that when the thermo-setting material is inserted within the channels the material flows along the channels laterally along the holes to fill the interstices between the plurality of apertures and the elongate members within the apertures for maintaining a clearance between the workpiece and the elongate members and for fastening the layers of the workpiece together.

In a more specific embodiment of the present invention, the first lamina member which is planar further includes a sprue defined by one of the surface of the lamina member and a plurality of radially extending passages defined by the lamina member such that each of the passages extends radially from the sprue to one of the channels. The first end of each of the channels is plugged such that when the thermo-setting material is injected through the sprue the material flows along each of the passages and along each of the channels and holes to fill the interstices between the plurality of apertures and the elongate members for maintaining a clearance between the workpiece and the elongate members and for fastening the layers of the workpiece together. The longitudinal axis of each of the bores is normal to the longitudinal plane of the first lamina member and the cross sectional area of each of the elongate members is constant and less than the cross sectional area of each of the corresponding apertures in the workpiece.

The first end of each of the elongate members threadably cooperates with one of the bores defined by the first lamina member and a plurality of annular grooves are defined by and are disposed along the length of the elongate member such that material flowing laterally out of the holes flows around the grooves before flowing into the interstices between the plurality of apertures and the elongate members within the apertures.

In further alternative embodiment of the invention a second lamina member defines a second plurality of transverse bores each of the second plurality of bores being aligned with an aperture of the plurality of apertures in the workpiece such that the second ends of each of the plurality of elongate members are secured within a bore of the second plurality of bores when the elongate member extend through the workpiece. At least some of the lateral holes terminate within the bores of the second plurality of bores such that a portion of the thermo-setting material fills the interstices between the second end of each of the elongate members and the bores of the second lamina member to fill the clearance between the workpiece and the elongate members.

The method of fastening together a multi-layered workpiece includes clamping the first lamina member to the workpiece and drilling a plurality of bores therethrough. The first lamina member is unclamped from the workpiece and the elongate members are threaded into the bores of the first plurality of bores defined by the first lamina member. The second ends of the elongate members are guided through the plurality of apertures defined by the workpiece and a thermo-setting material is injected through the longitudinal channel when the first lamina member and the workpiece are juxtaposed relative each other. The thermo-setting material flows along the channel and through the holes to fill the interstices between the apertures and the adjacent elongate members for filling the clearance between the workpiece and the elongate members.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claim of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DISCUSSION

Figure 1:
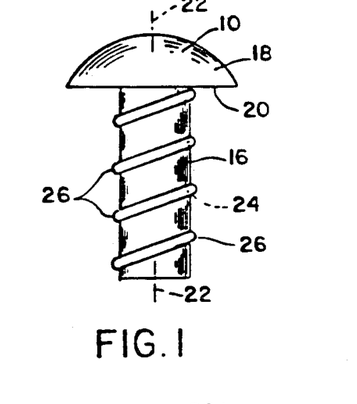
FIG. 1 is a side elevational view of a first embodiment of an improved fastening device.
Figure 2:
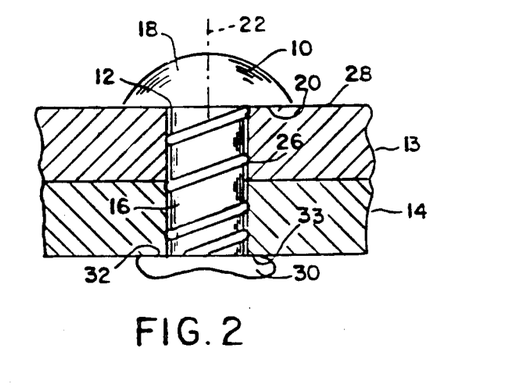
FIG. 2 is a side sectional view of the fastening device of FIGS. 1 secured within the aperture of a workpiece.
Figure 3:
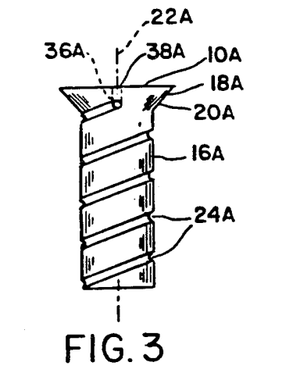
FIG. 3 is a side elevational view of a second embodiment of a fastening device.
Figure 4:
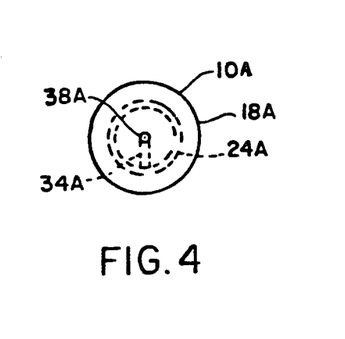
FIG. 4 is a plan view of FIG. 5.

FIG. 1 is a plan view of a fastening device 10 for securing within an aperture 12 shown in FIG. 2 of a workpiece 13 and 14. The fastening device comprises a longitudinally extending body member 16 preferably made of a metallic material such as copper, aluminum, brass, steel and the like having a fastening head 18 integrally attached thereto forming a locking means shown as a locking shoulder 20. The body member 16 is substantially cylindrical about an axis 22 with the shoulder 20 extending radially outwardly therefrom.

The invention comprises groove means 24 in this embodiment shown as a helix extending along the longitudinally extending body member 16 for receiving a resilient means 26 such as a resilient material which is secured to the groove means 24 by various means which are well known in the art.

FIG. 2 illustrates the insertion of the fastening device 10 within the aperture 12 of the workpiece 13 and 14 whereby the locking shoulder 20 engages a surface 28 of workpiece 13. The lower portion of the body member 16 is deformed at 30 creating a shoulder 32 to engage a bottom surface 33 of workpiece 14. It should be appreciated that the shoulder 32 and 20 engaging surfaces 28 and 33 mechanically secure the fastening device to the workpiece 13 and 14.

The cylindrical body member 15 is slightly smaller is diameter than the aperture 12 enabling the resilient means 26 to engage the surfaces of the aperture 12 to thereby reduce mechanical abrasion between the workpieces 13 and 14 and the fastening device 10. The resilient means 26 is disposed between the workpiece and the member 16 such that the resilient means 26 fills the clearance between the workpiece and the member 16. This reduction is abrasion substantially reduces fatiguing of the metallic fastening device which typically results in failure. FIGS. 1 and 2 illustrate an embodiment of the invention wherein the resilient means is installed on the fastening device prior to insertion within a workpiece.

FIGS. 3–6 illustrate a second embodiment of the invention wherein the resilient means is injected between the fastening device and the workpiece after insertion of the fastening device within the workpiece aperture. In this embodiment the fastening device 10A is adapted for insertion within an aperture 12A of workpieces 13A and 14A and comprises a longitudinally extending body member 16A having a fastening head 18A defining a locking shoulder 20A. A helical shaped groove 24A is disposed in the cylindrical surface of the body member 16A and is connected by passages 34A and 36A to an aperture 38A.

Figure 5:
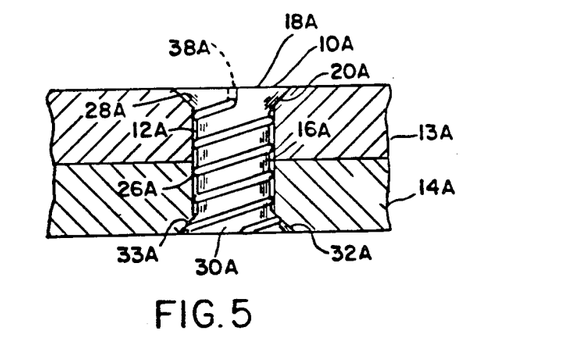
FIG. 5 is a side sectional view of the fastening device of FIGS. 3 and 4 secured within a workpiece.
Figure 6:
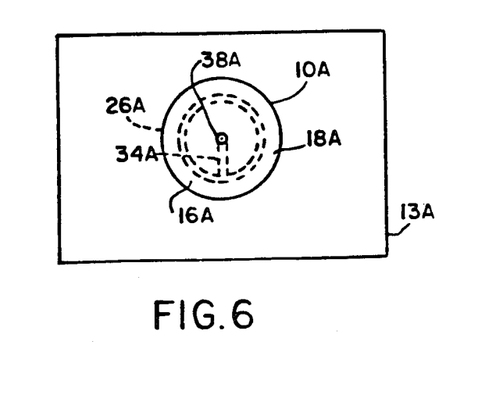
FIG. 6 is a plan view of FIG. 5.

FIG. 5 illustrates the securing of the fastening device 10A to the workpieces 13A and 14A. Shoulder 20A is abutted against surface 28a of workpiece 13A whereas the lower portion of the body member 10A is deformed at 30A to provide shoulder 32A for abutment with surface 33A of workpiece 14A. Thereafter a resilient material 26A is injected through aperture 38A to flow along passages 36A and 34A to fill groove 24A to provide a resilient engagement between the fastening device 10A and the workpieces 13A and 14A. The resilient material 26A fills the clearance between the workpieces and the fastening devices 10A such that no contact between the device 10A and the workpieces exists except through the material 26A. The resilient material 26A may be restricted to the region in proximity to the grooves 24A as shown or may be injected to fill other voids between the body member 16A and the aperture 12A, depending upon the particular application.

Figure 7:
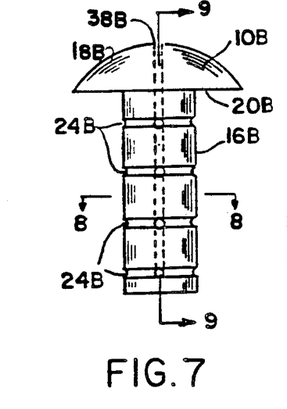
FIG. 7 is a side elevational view of a third embodiment of an improved fastening device.
Figure 8:
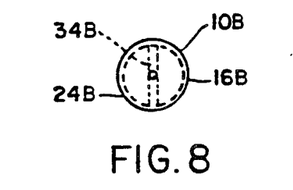
FIG. 8 is a sectional view along line 8—8 of FIG. 7.
Figure 9:
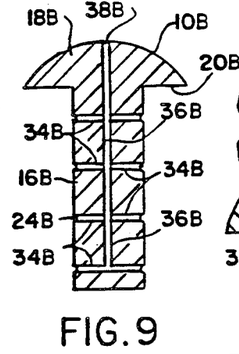
FIG. 9 is a sectional view along line 9—9 of FIG. 7.

FIGS. 7–9 illustrate a further embodiment of the invention comprising a fastening device 10B having a body member 16B with a head 18B defining a locking shoulder 20B. In this embodiment, a plurality of intermittently spaced annular grooves 24B are connected by passages 34B and a central passage 36B to an aperture 38B.

Figure 10:
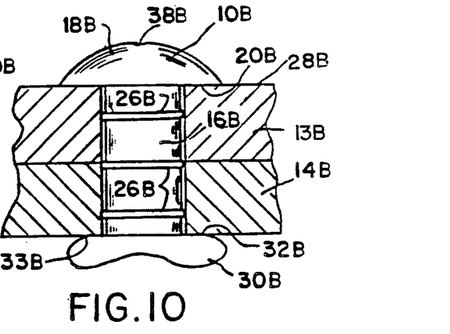
FIG. 10 is a side sectional view of the fastening device shown in FIGS. 7-9 secured to a workpiece.
Figure 11:
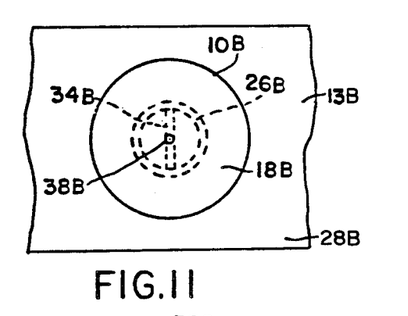
FIG. 11 is a plan view of FIG. 10.
Figure 12:
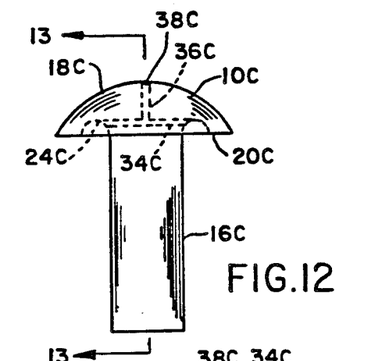
FIG. 12 is a side view of a fourth embodiment of an improved fastening device.
Figure 13:
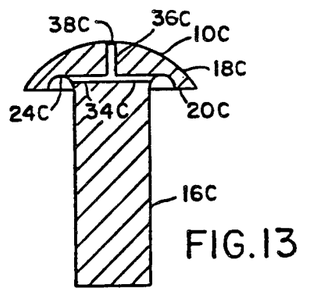
FIG. 13 is a sectional view along line 13—13 of FIG. 12.

FIGS. 10 and 11 illustrate the securing of the fastening device 10 into workpieces 13B and 14B. Shoulder 20B engages surface 28B with the lower portion of the body member 16B being deformed at 30B creating a shoulder 32B for engagement with surface 33B of workpiece 14B. Shoulders 20B and 32B create a seal with surfaces 28B and 33B of the workpieces 13B and 14B. The resilient material 26B is then injected through aperture 38B to flow along passage 36 and passage 34 to provide the resilient material between the fastening device 10B and the workpieces 13B and 14B. The illustration of FIG. 10 shows the resilient material being disposed only adjacent the grooves 23, but it is understood that continuing injection of the resilient material will result in further resilient material being disposed between the fastening device 10B and the workpieces 13B and 14B. In both cases the resilient material 26B maintains clearance between the workpieces and the fastening device 10B.

Figure 14:
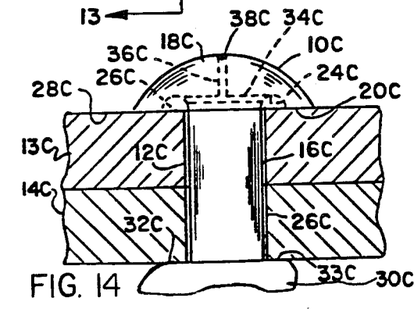
FIG. 14 is a side sectional view of the fastening device shown in FIG. 12 and 13 secured to a workpiece.
Figure 15:
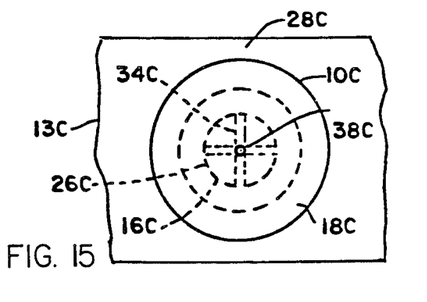
FIG. 15 is a plan view of FIG. 14.

FIGS. 12–15 illustrate still a fourth embodiment of the invention showing a fastening device 10C having a body member 16C and a fastening head 18C defining a locking shoulder 10C. A groove 24C is disposed in the shoulder surface 20C with passages 34C interconnected to a central passage 36C terminating in an aperture 38C. FIGS. 14 and 15 illustrate the securing of the fastening device 10C within the workpieces 13C and 14C. Shoulder surface 20C is abutting surface 28C of workpiece 13C whereas the lower portion of the body member 16C is deformed at 30C to create a shoulder 32C to engage surface 33C of workpiece 14C. The diameter of the cylindrical body member 16C is slightly smaller than the diameter of aperture 12C in workpieces 13C and 14C. Resilient material 26C is injected through aperture 38C to flow through central passages 36C and passage 34C to fill groove 24C. Continued injection results in resilient material flowing between the body member 16C and the workpieces 13C and 14C. A seal is formed by shoulder surface 20C and deformed shoulder 32C with the surfaces 28C and 33C respectively. It should be appreciated by those skilled in the art that in this embodiment, the complete region between the fastening device and the workpieces 13C and 14C is filled with the resilient material to reduce any movement between the workpieces 13C and 14C and the fastening device 10C.

Figures 16, 17:
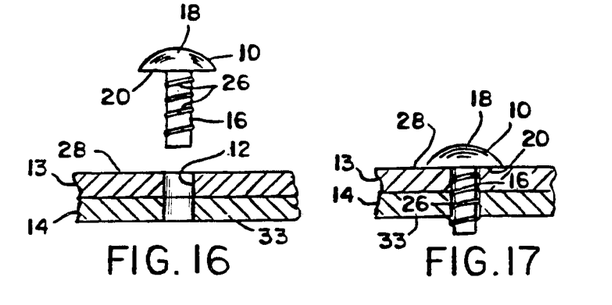
FIG. 16 is a first step in the first method of securing a fastening device to a workpiece.
FIG. 17 is a second step in the first method of securing a fastening device to a workpiece.
Figures 18, 19:
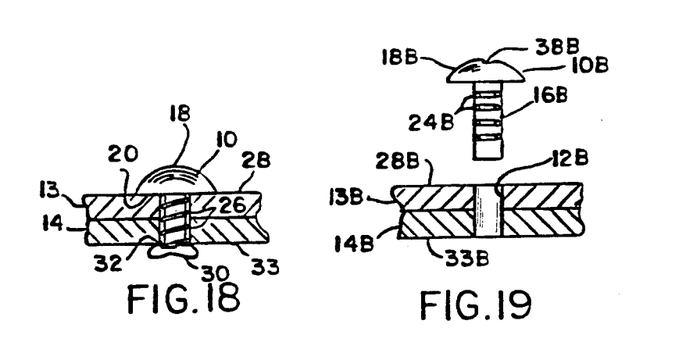
FIG. 18 is a third step in the first method of securing a fastening device to a workpiece.
FIG. 19 is a first step of the second method of securing a fastening device to a workpiece.

FIGS. 16–18 illustrate the steps in a first method of securing a fastening device within an aperture of the workpiece. The fastening device is illustrated as the device shown in FIGS. 1 and 2, but it should be appreciated that the use of this device is merely for an example of the method wherein the resilient means is fixed to the fastening device prior to insertion within the workpiece.

FIG. 16 illustrates the workpieces 13 and 14 and the fastening device 10 with the resilient means 26 affixed thereto. The resilient means 26 may be affixed by molding or adhesive or other similar means which are well known to the art.

FIG. 17 illustrates the insertion of the fastening device 10 within the aperture 12 of workpieces 13 and 14 with the resilient means 26 engaging the aperture surfaces 12.

FIG. 18 illustrates the formation of the lower portion of the body member 16 at 30 creating a shoulder 32 to engage surface 33 of workpiece 14 concomitantly with locking shoulder 20 engaging surface 28 of workpiece 13.

FIGS. 19–23 illustrate the steps of a second method of affixing a fastening device to an aperture within a workpiece. In this example, the fastening device is identical to that shown in FIGS. 7–11, but it should be appreciated by those skilled in the art that numerous other variations of mechanical fasteners may be incorporated utilizing the concept wherein the resilient means is injected through the fastening device subsequently to insertion within the workpiece.

FIG. 19 illustrates the fastening device 10B void of any resilient material thereon positioned over the workpieces 13B and 14B.

Figure 20:
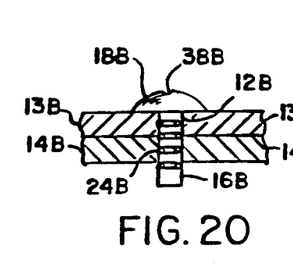
FIG. 20 is a second step of the second method of securing a fastening device to a workpiece.

FIG. 20 illustrates the insertion of the workpiece 10B into the aperture 12B of workpieces 13B and 14B.

Figure 21:
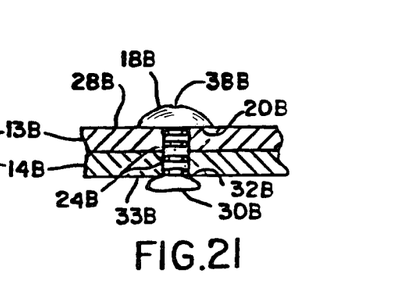
FIG. 21 is a third step of the second method of securing a fastening device to a workpiece.

FIG. 21 illustrates the deformation of the body member 16B at 30B forming shoulder 32B for engagement with surface 33B of workpiece 14B. Shoulder 20B is similarly in engagement with surface 28B of workpiece 13B.

Figure 22:
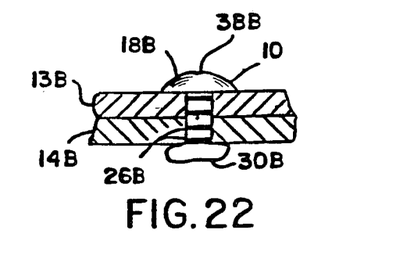
FIG. 22 is a fourth step of the second method of securing a fastening device to a workpiece.

FIG. 22 illustrates the result of injection of resilient material through aperture 38B for filling grooves 24B as explained heretofore. In this example, only the region adjacent the grooves has been filled with resilient material but it should be understood that this method is suitable for use with either a partial or complete filling of the void between the fastening device and the workpiece.

Figure 23:
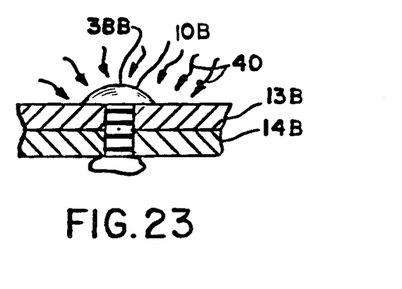
FIG. 23 is an optional fifth step of the second method of securing a fastening device to a workpiece.

FIG. 23 demonstrates the optional step of heating the fastening device as illustrated by the arrows 40 for use with a thermo-expandable or thermo-setting resilient material. It should also be understood that various types of material may be incorporated into this invention including epoxys, thermo-adhesives, preheated thermo expanding adhesives and the like. It should also be understood that the injection of material may take place subsequent to the deformation of the body member as shown in FIGS. 21 and 22 or, in the alternative, injection may be accomplished simultaneously with the deformation. Various other arrangement and variations may be resorted to without departing from this invention.

Figures 24, 25, 26, 27:
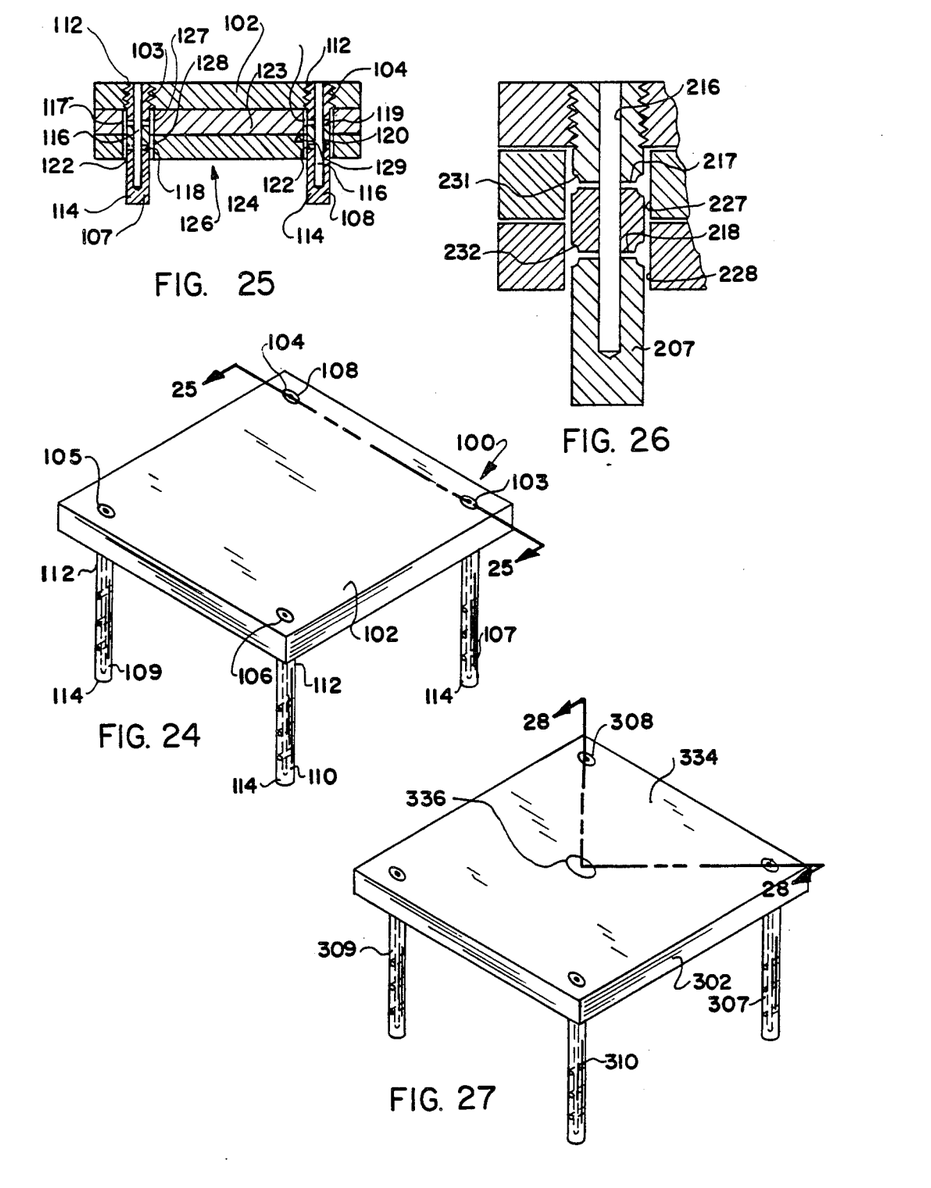
FIG. 24 is a perspective view of a fifth embodiment of the fastening device according to the present invention for fastening a multi-layer workpiece.
FIG. 25 is a sectional view taken on the line 25—25 of FIG. 24.
FIG. 26 is an enlarged sectional view of a sixth embodiment of the present invention showing the annular grooves defined by the elongate member.
FIG. 27 is a perspective view of a seventh embodiment of the present invention.

FIG. 24 is a perspective view of the fastening device generally designated 100 of a fifth embodiment of the present invention. The fastening device 100 includes a first lamina member 102 having a first plurality of bores 103, 104, 105 and 106 drilled normal therethrough. The first laminar member 102 is planar and of square configuration. Four elongate member 107, 108, 109 and 100 extend normally from the bores 103 to 106. Each of the elongate member 107 to 110 include a first and second end 112 and 114 respectively. The first ends 112 of the elongate members 108 to 110 are secured within the bores 103–106 of the elongate members 107 to 110.

As shown in FIG. 25 which is a sectional view taken on the line 25—25 of 24, the first ends 112 of the elongate members 107 and 108 are threadably engaged within the first lamina member 102. Each of the elongate members 107 to 110 include a longitudinal channel 116 which extends from the first end 112 of the elongate members 107 and 108 towards the second end 114 thereof. The channel 116 terminates before the second end 114 of the elongate member 107 and 108. A plurality of lateral holes 117, 118, 119 and 120 radiate from the longitudinal channel 116 and terminate at the outer surface 122 of the elongate members 107 and 108. A plurality of layers 123 and 124 of a workpiece generally designated 126 each includes a plurality of apertures 127, 128, 129 and 130 which are aligned with the bores 103 and 104 such that the second ends 114 of the elongate members 107 and 108 may be guided through the apertures 127–130 until the first lamina member 102 is disposed adjacent to the layer 123. A thermo-setting material such as an epoxy resin is injected into the longitudinal channel 116 at the first end 112 of the elongate members 107 and 108 and the resin (not shown) flows along the longitudinal channel 16 and laterally through the holes 117–120 to fill the interstices between the apertures 127 to 130 and the elongate members 107 and 108. The resin fills the clearance between the workpiece and the elongate members such that no contact between the workpiece and the elongate members exists except through the resin.

FIG. 26 is an enlarged sectional view of a sixth embodiment of the present invention and shows an elongate member 207 which defines a plurality of annular grooves 231 and 232 disposed along the length of the elongate member 207 such that the annular grooves 231 and 232 communicate with the lateral holes 217 and 218 respectively such that resin flowing along the channel 216 and through the lateral holes 217 and 218 passes around the annular grooves 231 and 232 before filling the interstices disposed between the apertures 227 and 228 and the elongate member 207.

FIG. 27 shows a perspective view of a seventh embodiment of the present invention in which one surface 334 of the first lamina member 302 defines a sprue 336 for simultaneously injecting the resin within each of the channels of each of the elongate members 307, 308, 309, and 310.

Figure 28:
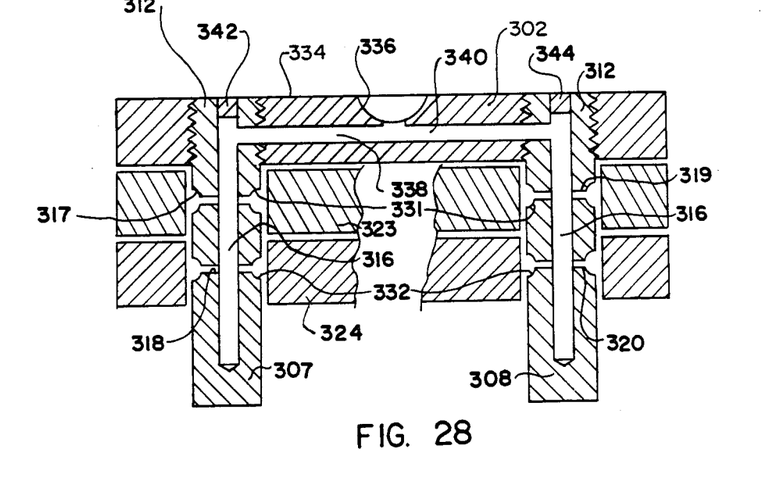
FIG. 28 is an enlarged sectional view taken on the line 28—28 of FIG. 27.

FIG. 28 is a sectional view taken on the line 28—28 of FIG. 27 and shows the sprue 336 defined by the outer surface 334 of the first lamina member 302. A plurality of passages 338 and 340 extend radially from the sprue 336 and communicate with the channels 316 of the elongate members 307 and 308 adjacent the first ends 312 of the elongate members. The first ends 312 of the longitudinal members 307 and 308 are plugged by plugs 342 and 344 respectively such that when resin is injected into the sprue 336 resin will flow radially through the passages 338 and 340 and will flow along the channels 316 and laterally through the holes 317, 318, 319 and 320 and around the annular grooves 331 and 332 to fill the interstices between the layers 323 and 324 and the elongate members 307 and 308.

Figure 29:
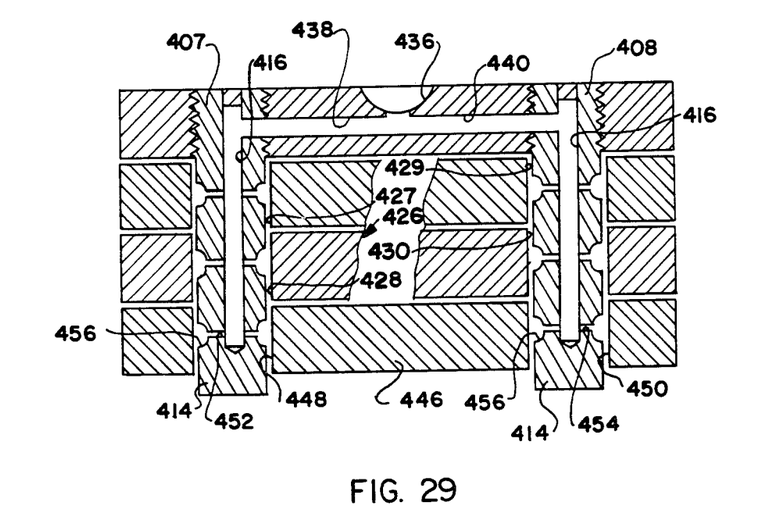
FIG. 29 shows an eighth embodiment of the present invention showing the second lamina member disposed adjacent the workpiece.

FIG. 29 is an eighth alternative embodiment of the present invention and is similar to the embodiment shown in FIG. 28 but shows a second lamina member 446 which defines bores 448 and 450 of a second plurality of bores which are aligned with the apertures 427, 428, 429 and 430 defined by the workpiece 426. The second ends 414 of elongate members 407 and 408 extend through the bores 448 and 450 and a plurality of further lateral holes 452 and 454 extend radially from the channels 416 to a further annular groove 456 which is disposed within the bores 448 and 450 such that when resin flows through the longitudinal channels 416 and laterally through the holes 452 and 454 the annular groove 456 is filled prior to the resin flowing between the interstices between the second lamina member 446 and the second end 414 of the elongate members 407 and 408 of the fifth embodiment.

In each of the sixth, seventh and eighth embodiment an essential feature of the present invention resides in the provision of a clearance between the workpiece and the elongate members, such clearance being filled with resin.

In operation of the fastening device 100, the first lamina member 102 is clamped to the workpiece 126 and a plurality of bores are drilled through the adjacent first lamina member and workpiece. A threaded first end of the elongate members 107 and 108 threadably engage the bores 103 and 104 and the second end 114 of each of the elongate members 107 and 108 are guided through the apertures 127 and 128 of the workpiece 126 until the first layer 123 of the workpiece 126 is disposed adjacent to the first lamina member 102. A thermo-setting resin is injected through the longitudinally channels 116 adjacent the first end 112 of the longitudinal channels 116 such that the resin flows along the longitudinal channel and flows laterally along the lateral 117 and 118 holes to fill the interstices between the apertures of the workpiece and the longitudinal member.

In the sixth alternative embodiment the resin flows from the lateral holes and around the annular grooves 231 and 232 before the flowing into the interstices between the apertures and the elongate members.

The seventh alternative embodiment includes inserting the elongate members 307 and 308 through the apertures in the workpiece as in the other embodiments of the present invention but instead of individually injecting the resin through each of the individual channels, the resin is simultaneously injected into all of the channels by injecting the resin through the sprue 336 such that the resin flows radially through the passages 338 and 340 which are in communication with the respective longitudinal channels.

In operation of the eighth embodiment of the present invention, the second ends of the elongate members 407 and 408 are inserted through the bores 448 and 450 of the second plurality of bores after the workpiece has been connected to the longitudinal members, thereafter the resin is simultaneously injected within each of the longitudinal channels 116 from the sprue 436 and the passages 438 to 440 and the resin flows laterally through the holes 452 and 454 and around the annular groove 456 before filling the interstices between the bores 448 and 450 and the second end 414 of the elongate members 407 and 408.

The fifth to eighth embodiments of the present invention provide a fastening device for fastening together a plurality of layers of a workpiece to provide a completely smooth surface, thereby reducing wind resistance or the like. Furthermore, the present invention provides a flexible bond between the elongate members and the workpiece which reduces the metal fatigue between the layers of the workpiece.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, I claim:

1. A fastening device for securing to a workpiece means utilizing a bonding material, the workpiece means defining a plurality of apertures within the workpiece means, said fastening device comprising:
   a lamina member;
   a plurality of elongated members;
   each of said plurality of elongated members having a first end secured to said lamina member and having a second end extending from said lamina member;
   each of said plurality of elongated members being aligned with the plurality of apertures of the workpiece means, respectively;
   a longitudinal channel defined within each of said elongate members extending proximate said first ends of said elongate members and terminating before said second ends of said elongate members;
   a plurality of lateral holes extending from said longitudinal channel to an outer surface of each of said elongate members,
   each of said plurality of elongated members being dimensioned for creating interstices between said outer surfaces of said elongate members and the plurality of apertures of the workpiece means when said plurality of elongated members are received within the plurality of apertures of the workpiece means; and
   said longitudinal channels and said plurality of lateral holes enabling the bonding material to be introduced into said longitudinal channels to flow through said lateral holes for filling the interstices between said outer surfaces of said elongate members and the plurality of apertures of the workpiece means to secure said fastening device to the workpiece means.

2. A fastening device as set forth in claim 1, wherein each of said second ends of said elongate members are deformable for mechanically securing said fastening device to the workpiece means.

3. A fastening device as set forth in claim 1, wherein each of said longitudinal channels extends to said first end of said elongated members.

4. A fastening device as set forth in claim 1, wherein said lamina member further includes a sprue communicating with an outer surface of said lamina member;
   a plurality of extending passages defined within said lamina member interconnecting said sprue with said said longitudinal channels,
   said longitudinal channels within each of said elongate members terminating before said first and said second ends of said elongate members; and
   said sprue permitting the bonding material to be introduced into said sprue to flow through said plurality of extending passages to enter each of said longitudinal channels of said elongated members.

5. A fastening devices as set forth in claim 1, wherein each of said elongate members has a constant cross-sectional area; and said constant cross-sectional area of said elongate members being less than the cross-sectional area of each of the plurality of apertures of the workpiece means for defining the interstices between said outer surfaces of said elongate members and the plurality of apertures of the workpiece means.

6. A fastening device as set forth in claim 1, wherein each of said lateral holes extends transversely through said elongated member and intersects with said longitudinal channel.

7. A fastening device as set forth in claim 1, wherein each of said lateral holes comprises a plurality of lateral holes extending transversely through said elongated member and intersecting with said longitudinal channel; and said plurality of lateral holes being spaced along said longitudinal channel of each of said elongated member.

8. A fastening device as set forth in claim 1, including a plurality of annular grooves disposed in said outer surface of each of said elongate members; and each of said plurality of annular grooves communicating with said lateral holes enabling the bonding material to flow out of said lateral holes and around said annular grooves to enter into the interstices between said outer surfaces of said elongate members and the plurality of apertures.

9. A fastening device for securing to a workpiece means utilizing a bonding material, the workpiece means defining a plurality of apertures within the workpiece means, said fastening device comprising:

a substantially planar lamina member defining a plurality of bores;

said plurality of bores of said fastening device being aligned with the plurality of apertures of the workpiece means;

a plurality of elongated members each having a first and a second end;

said first ends of said elongate members being secured to said plurality of bores of said fastening device;

a longitudinal channel defined within each of said elongate members extending proximate said first ends of said elongate members and terminating before said second ends of said elongate members;

a plurality of lateral holes extending from said longitudinal channel to an outer surface of each of said elongate members, each of said plurality of elongated members being dimensioned for creating interstices between said outer surfaces of said elongate members and the plurality of apertures of the workpiece means when said plurality of elongated members are received within the plurality of apertures of the workpiece means; and said longitudinal channels and said plurality of lateral holes enabling the bonding material to be introduced into said longitudinal channels to flow through said lateral holes for filling the interstices between said outer surfaces of said elongate members and the plurality of apertures of the workpiece means to secure said fastening device to the workpiece means.

10. A fastening device as set forth in claim 9, wherein each of said plurality of bores of said lamina member extend along a bore axis; and said bore axes of said plurality of bores being disposed normal to said substantially planar lamina member.

11. A fastening devices as set forth in claim 9, wherein each of said plurality of bores of said fastening device includes thread means; and each of said first ends of said elongate members having thread means for threadably cooperating with said threads means of said plurality of bores for securing said elongated members to said lamina member.

12. A fastening device as set forth in claim 9, wherein each of said second ends of said elongate members are deformable for mechanically securing said fastening device to the workpiece means.

13. A fastening device as set forth in claim 9, wherein said lamina member further includes a sprue communicating with an outer surface of said lamina member;

a plurality of extending passages defined within said lamina member interconnecting said sprue with said longitudinal channels, said longitudinal channels within each of said elongate members terminating before said first and said second ends of said elongate members; and said sprue permitting the bonding material to be introduced into said sprue to flow through said plurality of extending passages to enter each of said longitudinal channels of said elongated members.

14. A fastening device as set forth in claim 9, wherein each of said lateral holes extends transversely through said elongated member and intersects with said longitudinal channel.

15. A fastening device as set forth in claim 9, including a plurality of annular grooves disposed in said outer surface of each of said elongate members; and each of said plurality of annular grooves communicating with said lateral holes enabling the bonding material to flow out of said lateral holes and around said annular grooves to enter into the interstices between said outer surfaces of said elongate members and the plurality of apertures.

16. A fastening device for securing to a workpiece means utilizing a bonding material, the workpiece means defining a plurality of through apertures extending between a first and a second workpiece surface, said fastening device comprising:

a first lamina member;

a plurality of elongated members with each of said plurality of elongated members having a first and a second end;

said first ends of said elongate members being secured to said first lamina member with said second end of said elongated members extending from said first lamina member;

each of said plurality of elongated members being aligned with the plurality of apertures of the workpiece means;

a longitudinal channel defined within each of said elongate members extending proximate said first ends of said elongate members and terminating before said second ends of said elongate members;

a plurality of lateral holes extending from said longitudinal channel to an outer surface of each of said elongate members, a second lamina member defining a plurality of bores;

said plurality of bores of said fastening device being aligned with said plurality of said elongated members extending from said first lamina member;

each of said plurality of elongated members being receivable within the plurality of apertures of the workpiece means with said second ends of said elongated members extending beyond the second workpiece surface of the workpiece means when said first lamina member engages the first workpiece surface of the workpiece means;

each of said second ends of said plurality of elongated members being receivable within the plurality of bores of said second lamina member when said second lamina member engages the second workpiece surface of the workpiece means;

means for securing said second ends of said plurality of elongated members to said second lamina member with the workpiece means disposed between the workpiece means;

each of said plurality of elongated members being dimensioned for creating interstices between said outer surfaces of said elongate members and the plurality of apertures of the workpiece means when said plurality of elongated members are received within the plurality of apertures of the workpiece means; and said longitudinal channels and said plurality of lateral holes enabling the bonding material to be introduced into said longitudinal channels to flow through said lateral holes for filling the interstices between said outer surfaces of said elongate members and the plurality of apertures of the workpiece means to secure said fastening device to the workpiece means.

17. A fastening device as set forth in claim 16, wherein said means for securing said second ends of said plurality of elongated members with said said second lamina member includes each of said second ends of said elongate members being deformable for mechanically securing said second ends of said plurality of elongated members with said plurality of bores of said second lamina member.

18. A fastening device as set forth in claim 16, wherein said first lamina member is substantially planar and defines a longitudinal plane of said lamina member.

19. A fastening device as set forth in claim 16, wherein said first lamina member further includes a sprue communicating with an outer surface of said first lamina member;

a plurality of extending passages defined within said first lamina member interconnecting said sprue with said said longitudinal channels, said longitudinal channels within each of said elongate members terminating before said first and said second ends of said elongate members; and said sprue permitting the bonding material to be introduced into said sprue to flow through said plurality of extending passages to enter each of said longitudinal channels of said elongated members.

20. A fastening devices as set forth in claim 16, wherein each of said elongate members has a constant cross-sectional area; and said constant cross-sectional area of said elongate members being less than the cross-sectional area of each of the plurality of apertures of the workpiece means for defining the interstices between said outer surfaces of said elongate members and the plurality of apertures of the workpiece means.

21. A fastening device as set forth in claim 16, wherein each of said lateral holes extends transversely through said elongated member and intersects with said longitudinal channel.

22. A fastening device as set forth in claim 16, wherein each of said lateral holes comprises a plurality of lateral holes extending transversely through said elongated member and intersecting with said longitudinal channel; and said plurality of lateral holes being spaced along said longitudinal channel of each of said elongated member.

23. A fastening device as set forth in claim 16, including a plurality of annular grooves disposed in said outer surface of each of said elongate members; and each of said plurality of annular grooves communicating with said lateral holes enabling the bonding material to flow out of said lateral holes and around said annular grooves to enter into the interstices between said outer surfaces of said elongate members and the plurality of apertures

* * * * *

UNITED STATES PATENT AND TRADEMARK OFFICE
CERTIFICATE OF CORRECTION

PATENT NO. : 4,776,738

DATED : October 11, 1988

INVENTOR(S) : Emanuel A. Winston

It is certified that error appears in the above-identified patent and that said Letters Patent is hereby corrected as shown below:

At column 6, line 25, delete "5" and insert therefor --3--.
At column 9, line 66, delete "100" and insert therefor --110.

Signed and Sealed this

Tenth Day of October, 1989

Attest:

DONALD J. QUIGG

Attesting Officer

Commissioner of Patents and Trademarks